US010704466B2

(12) United States Patent
Dierksmeier

(10) Patent No.: US 10,704,466 B2
(45) Date of Patent: Jul. 7, 2020

(54) HIGH-MACH VEHICLE COOLING

(71) Applicant: Rolls-Royce North American Technologies Inc., Indianapolis, IN (US)

(72) Inventor: Douglas D. Dierksmeier, Franklin, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 207 days.

(21) Appl. No.: 15/882,463

(22) Filed: Jan. 29, 2018

(65) Prior Publication Data
US 2019/0234308 A1 Aug. 1, 2019

(51) Int. Cl.
| F02C 7/14 | (2006.01) |
| F02K 7/16 | (2006.01) |
| F01D 15/10 | (2006.01) |
| F02C 9/16 | (2006.01) |
| F25B 11/02 | (2006.01) |
| B64D 13/06 | (2006.01) |
| B64D 13/08 | (2006.01) |

(52) U.S. Cl.
CPC ............... *F02C 7/14* (2013.01); *F01D 15/10* (2013.01); *F02C 9/16* (2013.01); *F02K 7/16* (2013.01); *F25B 11/02* (2013.01); *B64D 13/08* (2013.01); *B64D 2013/0611* (2013.01); *B64D 2013/0644* (2013.01); *F05D 2220/10* (2013.01)

(58) Field of Classification Search
CPC ...... F02C 7/14; F02C 9/16; F02K 7/16; F01D 15/10; F25B 11/02; B64D 13/08; B64D 2013/0611; B64D 2013/0644; F05D 2220/10
See application file for complete search history.

(56) References Cited

U.S. PATENT DOCUMENTS

| 2,473,496 A * | 6/1949 | Mayer ................... B64D 13/06 165/202 |
| 2,893,204 A * | 7/1959 | Anderson ............... F01D 15/10 60/39.183 |
| 3,097,504 A * | 7/1963 | Quick .................... B64D 13/06 62/241 |
| 4,275,857 A * | 6/1981 | Bergsten ................ B64D 33/02 137/15.1 |
| 4,523,517 A | 6/1985 | Cronin |
| 4,966,005 A * | 10/1990 | Cowell ................... B64D 13/06 62/172 |
| 5,918,472 A | 7/1999 | Jonqueres |

(Continued)

FOREIGN PATENT DOCUMENTS

| DE | 3824468 A1 | 1/1990 |
| GB | 900662 A | 7/1962 |
| GB | 914124 A | 12/1962 |

*Primary Examiner* — Ted Kim
(74) *Attorney, Agent, or Firm* — Barnes & Thornburg LLP

(57) ABSTRACT

Vehicles, such as aircraft, may include turbine-based combined cycle power plants (TBCC) for power to achieve high-mach speeds. Cooling systems for such TBCC may include a turbine-generator arranged to be driven for rotation by ambient air to reduce the temperature of the ambient air while providing electric power for use under cocooning of a primary gas turbine engine in favor of a scramjet engine during high-mach travel.

21 Claims, 2 Drawing Sheets

(56) References Cited

U.S. PATENT DOCUMENTS

| | | | |
|---|---|---|---|
| 6,127,758 A * | 10/2000 | Murry | B64D 41/007 244/53 R |
| 9,765,700 B2 | 9/2017 | Mackin et al. | |
| 2005/0081508 A1 * | 4/2005 | Edelman | F02K 7/16 60/224 |
| 2006/0042227 A1 * | 3/2006 | Coffinberry | F02C 6/08 60/226.1 |
| 2009/0151321 A1 * | 6/2009 | Jarmon | B64C 1/38 60/266 |
| 2015/0275762 A1 | 10/2015 | Kenyon et al. | |
| 2016/0096629 A1 | 4/2016 | Vaisman | |
| 2016/0122027 A1 * | 5/2016 | Snyder | B64D 41/00 60/204 |

* cited by examiner

HIGH-MACH VEHICLE COOLING

BACKGROUND

The present disclosure relates generally to vehicles adapted for travelling at high speed, and more specifically to vehicles adapted for travelling at speeds near the speed of sound up to significantly beyond the speed of sound.

High-mach aircraft can have distinctive system arrangements to achieve efficient operation at near sonic speeds and above. For example, airbreathing jet engine arrangements in adapted use for aircraft can provide high speed propulsion, but have a variety of support needs uncommon to other combustion engine types. Moreover, multi-mode propulsion configurations can be desirable to achieve the highest speed and/or highest altitude operations. Cooling aircraft and/or engine components in such high-mach environments can be challenging and may face design considerations also uncommon to other combustion engine types.

SUMMARY

The present disclosure may comprise one or more of the following features and combinations thereof.

According to one aspect of the disclosure a turbine-based combined cycle (TBCC) system of an aircraft may include a flow passageway including an inlet for receiving ambient air from the environment and an exhaust for discharging exhaust products, a combined cycle power assembly including a gas turbine engine and a scramjet engine, each being adapted for connection with the inlet to receive ambient air and with the exhaust to discharge exhaust products. The scramjet engine may be adapted for supersonic operation permitting cocooning of the gas turbine engine during flight. The TBCC may include a cooling assembly for providing cooling air. The cooling assembly may include an intake for receiving ambient air. The intake may be arranged in communication with a turbine-generator to receive the ambient air from the intake for driving the turbine-generator to cool the ambient air wherein the turbine-generator produces electric power for use by auxiliaries of the aircraft when the gas turbine engine is cocooned.

In some embodiments, the cooling assembly may include a refrigeration cycle for further cooling the ambient air after driving the turbine. In some embodiments, the refrigeration cycle may be a vapor compression cycle for further cooling the ambient air. In some embodiments, the refrigeration cycle may include an evaporator arranged to receive at least a portion of the ambient air exiting the turbine-generator, and a compressor for circulating a coolant to the evaporator to cool at least a portion of the ambient air. The evaporator may be connected with at least one of the gas turbine engine and the aircraft to provide the cooled portion of the ambient air for cooling. The compressor may be driven by the turbine-generator.

In some embodiments, the refrigeration cycle may include a condenser arranged to receive at least another portion of the ambient air exiting the turbine-generator for thermal exchange with the coolant received from the compressor to heat the another portion of the ambient air. The refrigeration cycle may include an expansion valve arranged between the condenser and the evaporator for reducing the pressure of the coolant. In some embodiments, the condenser may be connected with the exhaust of the flow passageway to discharge the another portion of the ambient air.

In some embodiments, the scramjet engine may be formed as a dual-mode engine having a ramjet mode and a scramjet mode. In some embodiments, the flow passageway may include a turbine section and a scramjet section each connected with the inlet. The turbine section may be connected with the gas turbine engine and the scramjet section may be connected with the ramjet engine to provide ambient air for combustion. In some embodiments, the flow passageway may include a flow valve positionable between a turbine position to direct the ambient air into the turbine section and a scramjet position to direct the ambient air into the ramjet section. In the scramjet position, the flow valve may block against flow into the gas turbine engine.

In some embodiments, an electric heater may arranged in the flow passageway. The heater may be arranged downstream of the turbine-generator to receive electrical power from the generator to heat at least a portion of ambient air that has passed through the turbine-generator to dispel excess electrical power.

According to another aspect of the present disclosure, a cooling assembly of a turbine-based combined cycle (TBCC) system of an aircraft including a combined cycle power assembly having a gas turbine engine and a scramjet engine, each being adapted for connection with an inlet to receive ambient air from the environment, the scramjet engine adapted for supersonic operation permitting cocooning of the gas turbine engine, the cooling assembly may include an intake for receiving ambient air, and a turbine-generator arranged in communication with the intake to receive the ambient air from the intake for driving the turbine-generator to cool the ambient air. The turbine-generator may produce electric power for use by auxiliaries of the aircraft when the gas turbine engine is cocooned. The intake may be arranged in communication with the inlet to receive air.

In some embodiments, the assembly may include a refrigeration cycle for further cooling the ambient air after driving the turbine. The refrigeration cycle may be a vapor compression cycle for cooling the ambient air. The refrigeration cycle may include an evaporator arranged to receive at least a portion of the ambient air exiting the turbine-generator and a compressor for circulating a coolant to the evaporator to cool at least a portion of the ambient air.

In some embodiments, the evaporator may be connected with at least one of the gas turbine engine and the aircraft to provide the cooled portion of the ambient air for cooling. In some embodiments, the compressor may be driven by the turbine-generator.

In some embodiments, the refrigeration cycle may include a condenser arranged to receive at least another portion of the ambient air exiting the turbine-generator for thermal exchange with the coolant received from the compressor to heat the another portion of the ambient air, and an expansion valve arranged between the condenser and the evaporator for reducing the pressure of the coolant. In some embodiments, the condenser may be connected with the exhaust of the flow passageway to discharge the another portion of the ambient air.

In some embodiments, the scramjet engine may be a dual-mode engine including a ramjet mode and a scramjet mode. In some embodiments, the flow passageway may include a turbine section and a scramjet section each connected with the intake. The turbine section may be connected with the gas turbine engine and the scramjet section may be connected with the ramjet engine to provide ambient air for combustion.

In some embodiments, the flow passageway may include a flow valve positionable between a turbine position to direct the ambient air into the turbine section and a scramjet position to direct the ambient air into the scramjet section. In the scramjet position the flow valve may block against flow into the gas turbine engine.

These and other features of the present disclosure will become more apparent from the following description of the illustrative embodiments.

DETAILED DESCRIPTION OF THE DRAWINGS

Figure 1:
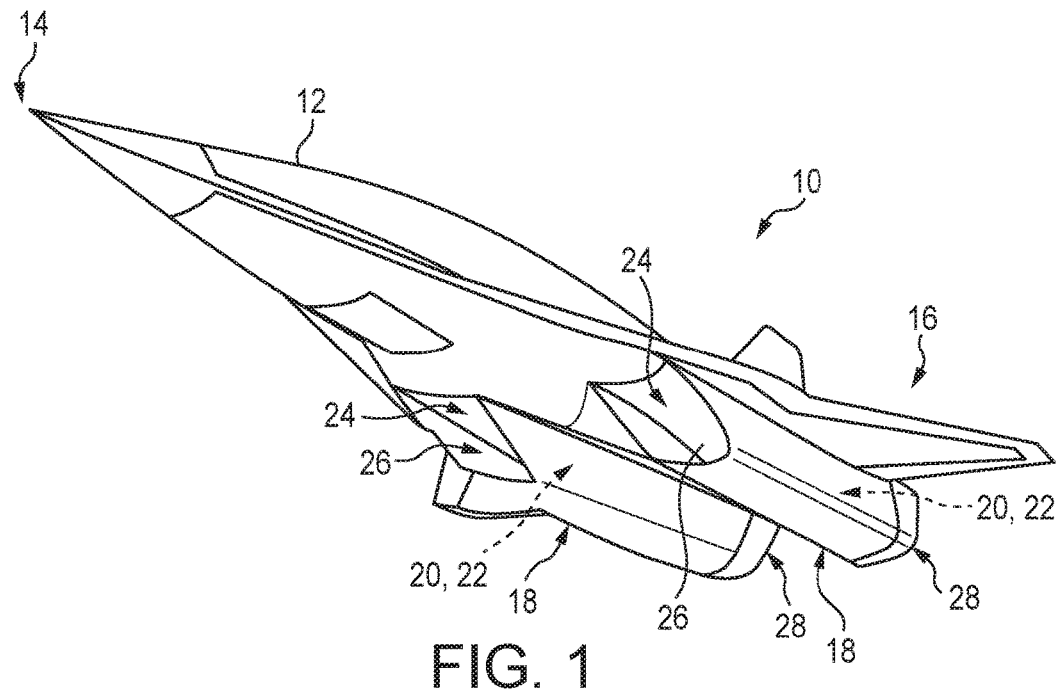
FIG. 1 is an perspective view of a high-mach aircraft having a nose end and tail end and including a pair of turbine-based combined cycle power plants (TBCC) for providing thrust to the aircraft, each TBCC is arranged underwing within an outer nacelle and each TBCC includes an inlet for receiving ambient air into the TBCC for combustion and an exhaust for discharging exhaust products.

For the purposes of promoting an understanding of the principles of the disclosure, reference will now be made to a number of illustrative embodiments illustrated in the drawings and specific language will be used to describe the same.

Aircraft capable of near sonic, supersonic, and/or hypersonic speeds can endure environmental factors distinct from lower speed travel. For example, the high stagnation temperatures and pressures of ambient air on aircraft travelling at these high velocities can make cooling aircraft and/or engine components a challenge. Previous designs may inject water into a collected ambient air stream to cool the inbound air. However, storage and handling of injection water can add weight to the aircraft and relies on an expendable resource. Examples of such high-mach vehicles may include the SR-71 Blackbird and/or SR-72 as marketed by Lockheed Martin of Bethesda, Md.

An illustrative high-mach vehicle is shown as aircraft 10 in FIG. 1 including a body 12 having nose end 14 and tail end 16. The aircraft 10 illustratively includes a pair of power plants, embodied as turbine-based combined cycle power plants (TBCC) 18, secured to the body 12 within an outer nacelle in an underwing arrangement. The TBCC 18 are adapted to provide thrust and may also be adapted to provide electrical power and/or mechanical power to the aircraft 10.

As discussed in additional detail below, each TBCC 18 includes a pair of engines 20, 22 for powering the aircraft 10. In the illustrative embodiment, each TBCC 18 includes a flow passageway 24 in communication with the engines 20, 22 to provide ambient air for combustion. Each flow passageway 24 includes the inlet 26 for receiving ambient air from the environment for use in the engines 20, 22, and the exhaust 28 for discharging products of combustion from the engines 20, 22.

Figure 2:
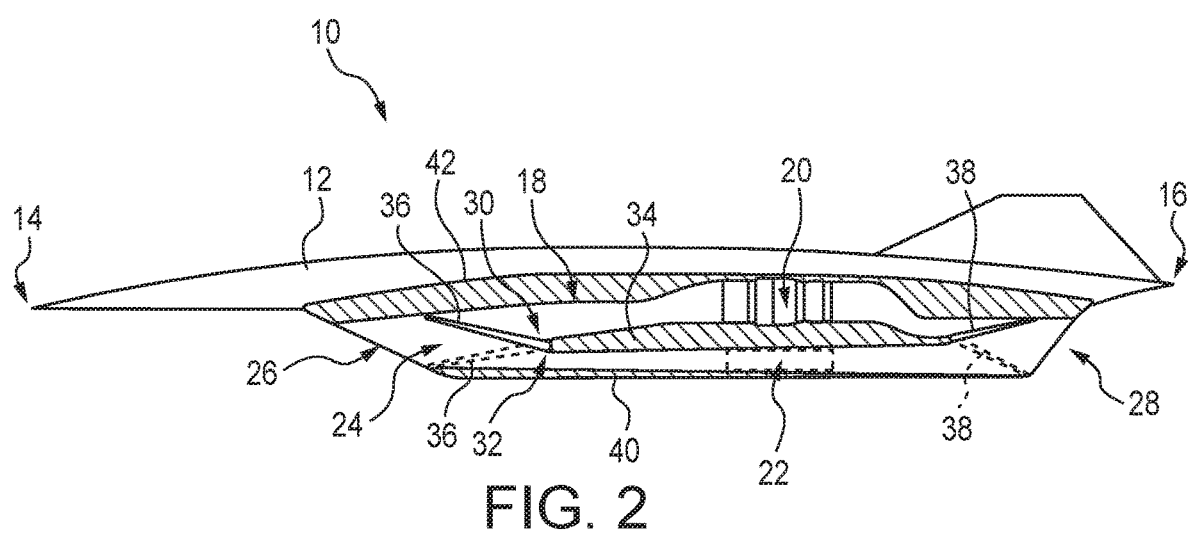
FIG. 2 is cross-sectional view of one of the turbine-based combined cycle power plants (TBCC) along the nose to tail dimension showing that the TBCC includes a passageway including the inlet and exhaust connected with each of a gas turbine engine and a scramjet engine, and showing that a flow control valve is positionable between a turbine position (in dashed line) and a scramjet position (in solid line) to selectively direct ambient air respectively to the gas turbine engine and scramjet engine.

As shown in the illustrative embodiment of FIG. 2, the cross-section of the engine nacelle reveals the arrangement of the engines 20, 22 of the TBCC 18. Engine 20 is illustratively embodied as a gas turbine engine having compressor, combustor, and turbine sections arranged to compress, combust, and expand a mixture of air and fuel to produce mechanical power. One example of a suitable gas turbine engine can include a turbofan engine such as the AE3007 as marketed by Rolls-Royce Corporation of Indianapolis, Ind. The engine 22 is illustratively embodied as a scramjet engine, and namely a dual-mode scramjet engine which includes both a ramjet mode and a scramjet mode, but in some embodiments, a ramjet or single-mode scramjet engine may be applied.

Ramjet and a scramjet engines are both considered similarly functioning airbreathing jet engines which use the velocity of incoming air to provide compression. For purposes of this description, a ramjet engine (and/or ramjet mode of a dual-mode engine) may decelerate the velocity of air into the combustion zone before combustion, while a scramjet (or scramjet mode of a dual-mode engine) may maintain supersonic air speed throughout the engine. In a simplified example, unlike the gas turbine engine 20 which includes a compressor to actively compress incoming air for combustion, the scramjet engine 22 generally relies on the speed of the aircraft to provide compression of incoming air. Additionally, because no compressor is required for compression, scramjet engines can omit the turbine section which drives the compressor in a gas turbine engine. However, the scramjet engine 22 is incapable and/or undesirable for operation below relatively high speeds. Thus, in the TBCC arrangement, the gas turbine engine 20 is operated to provide power at aircraft speeds (and thus air speeds) below the suitable range for operation of the scramjet engine 22. Yet, the scramjet engine 22 is adapted for high efficiency operation at speeds beyond the efficient use of the gas turbine engine 20, for example, above Mach 2.5, and even at speed beyond the capability of the gas turbine engine 20, for example, above Mach 4. Under configurations in which the scramjet engine 22 is available to meet all thrust needs for the aircraft 10 (e.g., high-mach speeds), the gas turbine engine 20 can be effectively shut-down, referred to as cocooned, into a ready-to-start but non-operational mode. In certain speed bands, a transition operation may exist in which both the gas turbine engine 20 and the scramjet engine 22 operate to transition between low and high mach speeds of aircraft operation. In some embodiments, the engines 20, 22 may include other individual or complimentary modes of operation (e.g., standby). Accordingly, with the TBCC arrangement, the gas turbine engine 20 can provide propulsion up to speeds at which the scramjet engine 22 can operate to reach speeds several times the speed of sound. This can be particularly useful in high altitude flight.

In the illustrative embodiment as shown in FIG. 2, the engines 20, 22 are commonly connected with the inlet 26 of the passageway 24 for receiving ambient air. Downstream from the inlet 26, the passageway 24 illustratively includes a turbine section 30 connected with the gas turbine engine 20 and a scramjet section 32 connected with the scramjet engine 22. The scramjet section 32 is illustratively formed to funnel the incoming air for compression and combustion along with fuel within the scramjet engine 22. In some embodiments, the scramjet section 32 may have aerodynamic shape to reduce the speed of incoming air to cause compression for combustion together with fuel within the scramjet engine 22. A divider wall 34 illustratively separates the turbine and scramjet sections 30, 32.

As shown in FIG. 2, a flow control member 36 is illustratively arranged upstream of the turbine and scramjet sections 30, 32 of the passageway 24 for directing the flow of ambient air. The flow control member 36 is embodied as a control flap positionable between a turbine position (as shown in dashed line in FIG. 2) and a scramjet position (as shown in solid line in FIG. 2) to guide flow of ambient air from the inlet 26. The flow control member 36 is adapted as a valve to selectively direct flow of ambient air from the inlet 26 through the turbine section 30 to the gas turbine engine 20, and a scramjet position to direct flow of ambient air from the inlet 26 through the scramjet section 32 to the scramjet engine 22. In intermediate positions, the flow control member 36 may divide flow between the turbine and scramjet sections 30,32. The flow control member 36 is illustratively mounted on the divider wall 34 for pivoting between the turbine and scramjet positions. In some embodiments, the flow control member 36 may have any suitable arrangement for selective flow guidance, for example, may be mounted to the inner of outer walls of the passageway 24 and selectively positionable to block and/or divide flow between the engines 20, 22.

In the turbine position, the flow control member 36 extends across the upstream end of the scramjet section 32 (between the divider wall 34 and the lower outer wall 40 of the nacelle) to block against flow of ambient air entering the scramjet section 32 and thus into the scramjet engine 22. In the scramjet position, the flow control member 36 extends across the upstream side of the turbine section 30 (between the divider wall 34 and the upper outer wall 42 of the nacelle) to block against flow of ambient air entering the scramjet section 32 and thus into the scramjet engine 22. The flow control member 36 is illustratively positionable by hydraulic actuator, but in some embodiments, may be electrically, manually, pneumatically and/or otherwise suitably actuated. An optional exhaust flow control member 38 may be arranged downstream of the engines 20, 22, positionable between a turbine position (as shown in dashed line in FIG. 2) and a scramjet position (as shown in solid line in FIG. 2) corresponding to the position of the flow control member 36 to assist in directing flow. As previously mentioned, air entering either of the engines 20, 22 is used with fuel for combustion to produce thrust by the expanding exhaust products. The exhaust products are dispelled through the exhaust 28.

Figure 3:
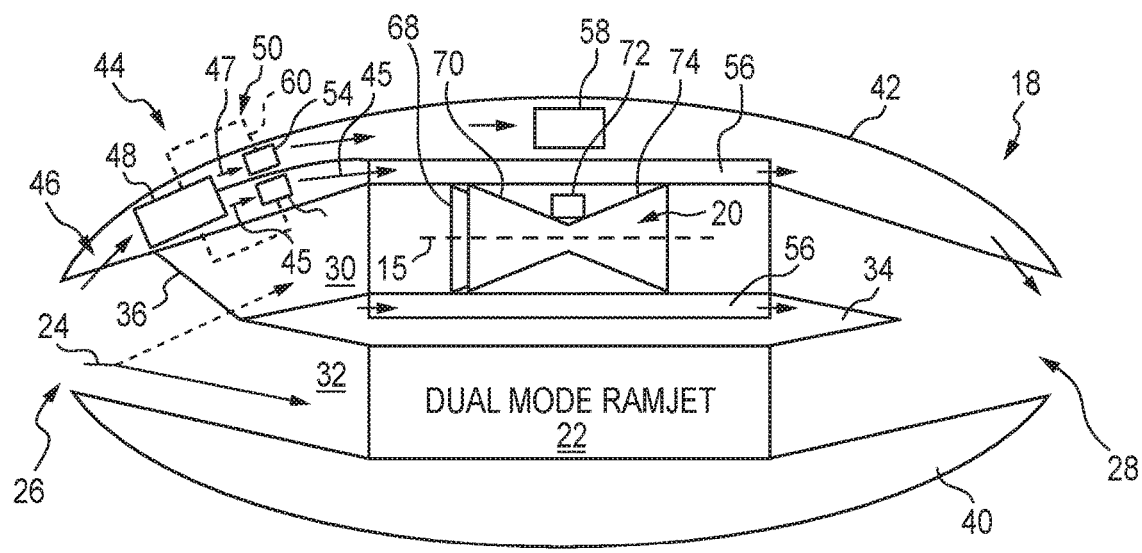
FIG. 3 is a diagrammatic view of the cross-sectional view of FIG. 2 showing that the turbine-based combined cycle power plant (TBCC) includes a cooling system for cooling a stream of air for use in cooling aircraft and/or engine components, and showing that the cooling system includes a turbine-generator expanding high pressure ambient air to produce electrical power, and a refrigeration cycle for cooling the stream of air.

Referring now to the diagrammatic view of FIG. 3, the TBCC 18 illustratively includes a cooling system 44 adapted to cool ambient air for use by the aircraft 10. As previously mentioned, at high-mach speeds, the stagnation temperature of ambient air entering the aircraft 10 can be higher than desired for certain uses such as component cooling. For example, ambient air entering the aircraft 10 may have a stagnation temperature of about 1800° F., while desired air temperature for certain component cooling may be about 100° F. to about 300° F. The cooling system 44 can reduce the temperature of a portion of ambient air entering the aircraft 10 while efficiently servicing other aircraft needs.

In the illustrative embodiment as shown in FIG. 3, the cooling system 44 includes an intake 46 in communication to receive ambient air. The intake 46 is illustratively formed in communication with the inlet 26 of the TBCC 18 to receive a portion of air entering the TBCC, but in some embodiments, may receive air from other sources, such as directly from ambient. In the illustrative embodiment, the cooling system 44 including the air flow portions are arranged within the wall 40, 42 of the nacelle, namely the outer wall 42. In some embodiments, the cooling system 44 may have any suitable arrangement for providing cooling air.

The cooling system 44 illustratively includes a turbine 48 in communication with the intake 46 to receive ambient air therefrom. The turbine 48 is illustratively embodied as a turbine-generator arranged to generate electrical power under the driving force of the ambient air expanding across the turbine 48. The electric power from the turbine-generator 48 is available to power auxiliary components of the aircraft 10. This electrical power generation can generally increase the thermal efficiency of the TBCC, but is particularly useful in operational states in which the gas turbine engine 20 is cocooned. Unlike the gas turbine engine 20 (which inherently includes rotating mechanical parts from which power offtake can be extracted, for example, to run an electric generators), the scramjet engine 22 does not ordinarily include rotational turbomachinery. Thus, auxiliary power offtake is not readily available from a scramjet engine 22 and existing designs have employed electrical power storage (e.g., battery cells) to provide electrical power during cocooning. By producing electrical power from the turbine-generator 48, the cooling air requirements can be met while harnessing the energy rejected from the ambient air for electrical power. The air exiting the turbine 48 has a lower temperature than the ambient air at the intake 46 due to the pressure reduction experienced across the turbine 48.

As shown in FIG. 3, the cooling system 44 illustratively includes a refrigeration cycle 50 for cooling at least a portion of the air exiting the turbine 48. The refrigeration cycle 50 is embodied as a vapor compression cycle including a refrigerant medium, for example, ammonia, passing in heat exchange to cool at least a portion of the air exiting the turbine 48. In some embodiments, the refrigerant may include any suitable coolant. The refrigeration cycle 50 includes an evaporator 52 for providing heat exchange between the refrigerant and a portion the air, and a condenser 54 for cooling the refrigerant. As discussed in additional detail below, the refrigeration cycle 50 includes compressor and expansion valve for assisting the cycle.

The air exiting the turbine 48 is illustratively divided into two streams for use as shown in FIG. 3. A first stream 45 of air exiting the turbine 48 illustratively enters the evaporator 52 to reject heat to the refrigerant. The evaporator 52 passes each of the first stream 45 and the refrigerant in thermal communication with each other to encourage heat from the first stream 45 to the refrigerant. The first stream 45 exiting the evaporator 52 is illustratively directed to portions 56 of the gas turbine engine 20 for cooling. In the illustrative embodiments, the portions 56 of the gas turbine engine 20 are electrical components, for example, components on the exterior of the gas turbine engine casing which should be desirably maintained below about 300° F. even under cocooning of the gas turbine engine 20. In some embodiments, the first stream 45 exiting the evaporator 52 may be directed to cool any suitable portions of the aircraft 10, for example but without limitation, passenger compartments. The first stream 45 having cooled the portions 56 may be directed into the exhaust 28 for discharge.

A second stream 47 of air exiting the turbine 48 illustratively enters the condenser 54 to receive heat from the refrigerant. The condenser 54 passes each of the second stream 47 and the refrigerant in thermal communication with each other to encourage heat from the refrigerant to the second stream 47. The second stream 47 illustratively serves at a heat sink for rejecting excess heat from the refrigeration cycle 50. The second stream 47 can pass through an optional electrical resistance heater 58 before expulsion into the exhaust 28 for discharge. The resistance heater 58 can serve to reject excess electrical load generated by the turbine-generator 48 to the second stream 47 in the form of heat, as required. The lower temperatures and pressures downstream of the turbine 48 in the cooling system 44 provide an environment conducive to heat rejection in high-mach scenarios where the velocity of air outside of the cooling system 44 can otherwise impede and/or complicate heat rejection. In such environments, flow dynamics may impede typical heat transfer operation in a variety of ways, for example, effective reducing heat transfer to occur within boundary layers of the flow. Moreover, additional heat into the exhaust can increase thrust capacity and/or increase operational efficiency.

Figure 4:
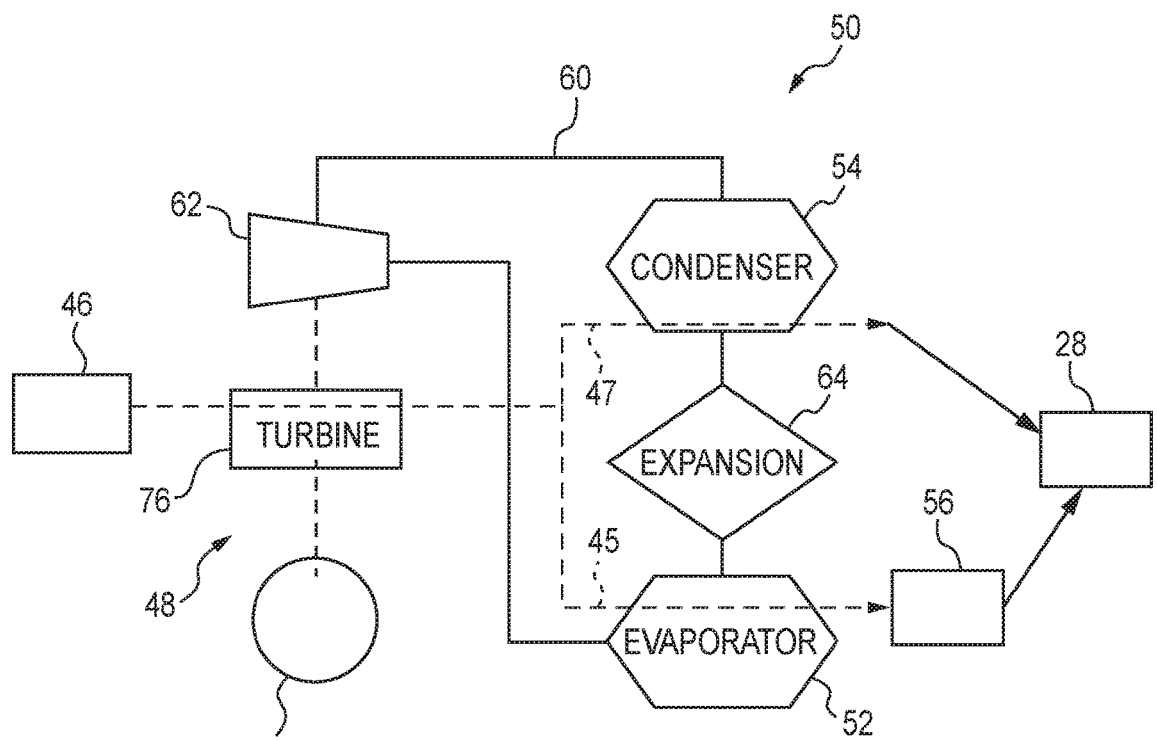
FIG. 4 is a diagrammatic view of the refrigeration cycle of the cooling system shown in FIG. 3 showing that the refrigeration cycle includes a compressor for compressing a refrigerant in the circuit, a condenser for rejecting the heat of the refrigerant, an expansion valve for reducing pressure of the refrigerant, and an evaporator for cooling the stream of ambient air, and showing that the compressor is powered by the turbine-generator.

As shown in the illustrative embodiment of FIG. 4, the refrigeration cycle 50 includes a refrigerant circuit 60 for conducting the refrigerant through the cycle 50. The compressor 62 compresses refrigerant received from the evaporator 52 and provides compressed refrigerant to the condenser 54 to reject heat to the stream 47. The cooled refrigerant from the condenser 54 is expanded through the expansion valve 64 and provided to the evaporator 52 to receive heat from the stream 45. In the illustrative vapor-compression cycle, the refrigerant undergoes phase changes within the evaporator 52 and condenser 54. Namely, the refrigerant is evaporated from liquid to gas in the evaporator 52 by the absorbed heat from the first stream 45 and is condensed from gas to liquid in the condenser 54 by rejecting heat to the second stream 47. Under expansion through the expansion valve 64, the refrigerant may undergo partial phase change from liquid to mixed phase (liquid-gas). In some embodiments, any suitable refrigeration cycle may be applied to cool the stream 45.

As shown in FIG. 4, the turbine-generator 48 is coupled with the compressor 62 to provide drive for compression. The turbine-generator 48 is illustratively embodied to provide electrical power to drive the compressor 62, but in some embodiments, may be mechanically coupled with the compressor 62 to provide direct drive. The turbine generator 48 illustratively includes a turbine section 76 and a generator section 78 coupled with the turbine section 76 to receive rotational drive to produce electrical power. In some embodiments, the generator section 78 may be omitted and the turbine section 76 may mechanically drive the compressor 62 for rotation. In some embodiments, any suitable configuration of turbomachinery components including a combustor and turbine may be applied, for example but without limitation, turbojet configurations without a fan.

Returning briefly to FIG. 3, as previously mentioned, the gas turbine engine 20 illustratively includes a fan 68, a compressor 70, a combustor 72, and a turbine 74 arranged to provide motive power. The fan 68 and the compressor 70 are driven by the turbine 74 to provide air for engine use. The compressor 70 compresses and delivers air to the combustor 72. The combustor 72 mixes fuel with the compressed air received from the compressor 70 and ignites the fuel. From the combustor 72, the hot, high-pressure exhaust products of the combustion reaction are directed into the turbine 74. The turbine 74 illustratively includes a rotor and blades extending radially from the rotor to receive expansion of the exhaust products causing the rotor to rotate about a central axis 15 and to drive the compressor 70 and the fan 68. In some embodiments, the gas turbine engine 20 may include a power offtake coupled with an electrical power generator for providing electric power during non-cocooned operational states.

The present disclosure includes devices, systems, assemblies, and methods of cooling for high-mach vehicles. Examples of cooling operations may include ambient air at a stagnation temperature of about 1800° F. at the inlet to the turbine 48 and exiting at about 400° F. Further cooling of the air through the evaporator 52 may provide a first air stream at about 100° F. and/or may heat a second air stream to about 500-600° F. In some embodiments, these exemplary temperatures may vary according to operational conditions and/or cooling demands. Illustrative embodiments within the present disclosure include refrigeration cycles to lower the temperature of cooling air, however, in some embodiments, the turbine 48 may be adapted to expand the air to reduce the temperature of its exiting air to the desire cooling temperature and the refrigeration cycle may be omitted.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine-based combined cycle (TBCC) system of an aircraft, the dual-mode engine comprising a flow passageway including an inlet for receiving ambient air from the environment, an exhaust for discharging exhaust products, a turbine section, and a scramjet section, the turbine section and the scramjet section each connected with the inlet, the turbine section connected with the gas turbine engine and the scramjet section connected with the scramjet engine to provide ambient air for combustion, a combined cycle power assembly including a gas turbine engine and a scramjet engine, each being adapted for connection with the inlet to receive ambient air and with the exhaust to discharge exhaust products, the scramjet engine adapted for supersonic operation permitting cocooning of the gas turbine engine during flight, a cooling assembly for providing cooling air during operation of the gas turbine engine and during operation of the scramjet engine, the cooling assembly including an intake for receiving ambient air, the intake arranged in communication with a turbine-generator to receive the ambient air from the intake for driving the turbine-generator to cool the ambient air, the turbine-generator directing exhausted ambient air into a first air channel and a second air channel separate from the first air channel, wherein the turbine-generator produces electric power for use by auxiliaries of the aircraft when the gas turbine engine is cocooned by a position of a flow valve arranged in the flow passageway, and a refrigeration cycle for further cooling the ambient air after driving the turbine, the refrigeration cycle directly thermally coupled with the first air channel and the second air channel, wherein the flow valve is positionable between a turbine position to direct the ambient air into the turbine section and a scramjet position to direct the ambient air into the scramjet section, and wherein in the scramjet position the flow valve blocks flow into the gas turbine engine when the gas turbine engine is cocooned.

2. The TBCC system of claim 1, wherein the refrigeration cycle is a vapor compression cycle for further cooling the ambient air.

3. The TBCC system of claim 1, wherein the refrigeration cycle includes an evaporator arranged to receive at least a portion of the ambient air exiting the turbine-generator, and a compressor for circulating a coolant to the evaporator to cool at least a portion of the ambient air.

4. The TBCC system of claim 3, wherein the evaporator is connected with at least one of the gas turbine engine and the aircraft to provide the cooled portion of the ambient air for cooling.

5. The TBCC system of claim 3, wherein the compressor is driven by the turbine-generator.

6. The TBCC system of claim 3, wherein the refrigeration cycle includes a condenser arranged to receive at least another portion of the ambient air exiting the turbine-generator for thermal exchange with the coolant received from the compressor to heat the another portion of the ambient air, and an expansion valve arranged between the condenser and the evaporator for reducing the pressure of the coolant.

7. The TBCC system of claim 6, wherein the condenser is connected with the exhaust of the flow passageway to discharge the another portion of the ambient air.

8. The TBCC system of claim 1, wherein the scramjet engine is a dual-mode engine having a ramjet mode and a scramjet mode.

9. The TBCC system of claim 1, wherein an electric heater is arranged in the flow passageway downstream of the turbine-generator to receive electrical power from the generator to heat at least a portion of ambient air that has passed through the turbine-generator to dispel excess electrical power.

10. A cooling assembly of a turbine-based combined cycle (TBCC) system of an aircraft, the TBCC system including a combined cycle power assembly having a gas turbine engine and a scramjet engine, and a flow valve selectively positionable to block flow into the gas turbine engine, the gas turbine engine and the scramjet engine each adapted for connection with an inlet to receive ambient air from the environment, the scramjet engine adapted for supersonic operation permitting cocooning of the gas turbine engine by a position of the flow valve blocking flow into the gas turbine engine, the cooling assembly comprising an intake for receiving ambient air, a turbine-generator arranged in communication with the intake to receive the ambient air from the intake for driving the turbine-generator to cool the ambient air, the turbine-generator directing exhausted ambient air into a first air channel and a second air channel separate from the first air channel, wherein the turbine-generator produces electric power for use by auxiliaries of the aircraft when the gas turbine engine is cocooned, and a refrigeration cycle for further cooling the ambient air after driving the turbine, the refrigeration cycle directly thermally coupled with the first air channel and the second air channel.

11. The cooling assembly of claim 10, wherein the refrigeration cycle is a vapor compression cycle for cooling the ambient air.

12. The cooling assembly of claim 10, wherein the refrigeration cycle includes an evaporator arranged to receive at least a portion of the ambient air exiting the turbine-generator and a compressor for circulating a coolant to the evaporator to cool at least a portion of the ambient air.

13. The cooling assembly of claim 12, wherein the evaporator is connected with at least one of the gas turbine engine and the aircraft to provide the cooled portion of the ambient air for cooling.

14. The cooling assembly of claim 12, wherein the compressor is driven by the turbine-generator.

15. The cooling assembly of claim 12, wherein the refrigeration cycle includes a condenser arranged to receive at least another portion of the ambient air exiting the turbine-generator for thermal exchange with the coolant received from the compressor to heat the another portion of the ambient air, and an expansion valve arranged between the condenser and the evaporator for reducing the pressure of the coolant.

16. The cooling assembly of claim 15, wherein the condenser is connected with the exhaust of the flow passageway to discharge the another portion of the ambient air.

17. The cooling assembly of claim 10, wherein the scramjet engine is a dual-mode engine including a ramjet mode and a scramjet mode.

18. The cooling system of claim 10, wherein the flow passageway includes a turbine section and a scramjet section each connected with the intake, the turbine section connected with the gas turbine engine and the scramjet section connected with the scramjet engine to provide ambient air for combustion.

19. The cooling system of claim 18, wherein the flow valve is positionable between a turbine position to direct the ambient air into the turbine section and a scramjet position to direct the ambient air into the scramjet section.

20. The cooling system of claim 19, wherein in the scramjet position the flow valve blocks flow into the gas turbine engine.

21. A turbine-based combined cycle (TBCC) system of an aircraft, the dual-mode engine comprising a flow passageway including an inlet for receiving ambient air from the environment and an exhaust for discharging exhaust products and a flow valve selectively positionable to block flow into the gas turbine engine, a combined cycle power assembly including a gas turbine engine and a scramjet engine, each being adapted for connection with the inlet to receive ambient air and with the exhaust to discharge exhaust products, the scramjet engine adapted for supersonic operation permitting cocooning of the gas turbine engine during flight by a position of the flow valve blocking flow into the gas turbine engine, and a cooling assembly for providing cooling air, the cooling assembly including:

an intake for receiving ambient air, the intake arranged in communication with a turbine-generator to receive the ambient air from the intake for driving the turbine-generator to cool the ambient air wherein the turbine-generator produces electric power for use by auxiliaries of the aircraft when the gas turbine engine is cocooned, and a refrigeration cycle for further cooling the ambient air after driving the turbine, the ambient air being split after exiting the turbine into a first portion of the ambient air and a second portion of the ambient air, the refrigeration cycle including:

an evaporator arranged to receive the first portion of the ambient air exiting the turbine-generator, and a compressor for circulating a coolant to the evaporator to cool the first portion of the ambient air, and a condenser arranged to receive the second portion of the ambient air exiting the turbine-generator for thermal exchange with the coolant received from the compressor to heat the second portion of the ambient air, and an expansion valve arranged between the condenser and the evaporator for reducing the pressure of the coolant.

* * * * *